United States Patent
Liao et al.

(10) Patent No.: US 9,405,418 B2
(45) Date of Patent: Aug. 2, 2016

(54) TOUCH DEVICE

(71) Applicant: Ye Xin Technology Consulting Co., Ltd., Hsinchu (TW)

(72) Inventors: Chin-Yueh Liao, Hsinchu (TW); Chia-Lin Liu, Hsinchu (TW); Wei-Chih Chang, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 36 days.

(21) Appl. No.: 14/496,253

(22) Filed: Sep. 25, 2014

(65) Prior Publication Data

US 2015/0085207 A1    Mar. 26, 2015

(30) Foreign Application Priority Data

Sep. 26, 2013   (TW) .............................. 102134738 A

(51) Int. Cl.
| | | |
|---|---|---|
| *G06F 3/044* | (2006.01) | |
| *G02F 1/1368* | (2006.01) | |
| *G02F 1/1333* | (2006.01) | |
| *G06F 3/041* | (2006.01) | |

(52) U.S. Cl.
CPC ............ *G06F 3/044* (2013.01); *G02F 1/13338* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 2006/0139522 A1* | 6/2006 | Chang | G02F 1/133514 349/114 |
| 2011/0012116 A1* | 1/2011 | Yamazaki | H01L 27/1225 257/59 |
| 2011/0090186 A1* | 4/2011 | Yamazaki | G09G 3/344 345/204 |
| 2014/0110708 A1* | 4/2014 | Koezuka | H01L 29/78696 257/43 |

FOREIGN PATENT DOCUMENTS

TW    201022784 A    6/2010

* cited by examiner

*Primary Examiner* — Ashok Patel
(74) *Attorney, Agent, or Firm* — ScienBiziP, P.C.

(57) ABSTRACT

A touch device includes a first conducting layer, a second conducting layer, and a resistance reduction layer. The first conducting layer is insulated to the second conducting layer to form a touch sensing structure. The resistance reduction layer is coupled to the first conducting layer. A combination of the resistance reduction layer and the first conducting layer has a resistance that is less than an intrinsic resistance of the first conducting layer.

19 Claims, 6 Drawing Sheets

TOUCH DEVICE

FIELD

The subject matter herein generally relates to a touch device.

BACKGROUND

A touch device, such as a mobile phone or a tablet PC, is more and more popular in our life. A capacitive touch device usually includes a number of touch sensors for detecting a touch operation applied on the touch device. However, in order to increase the resolution of the touch device, the number of touch sensors of the touch device become more and more, and then a response speed of the touch device is adversely affected. Thus, a touch device with increased response speed is needed.

BRIEF DESCRIPTION OF THE DRAWINGS

Implementations of the present technology will now be described, by way of example only, with reference to the attached figures, wherein.

DETAILED DESCRIPTION

Figure 1:
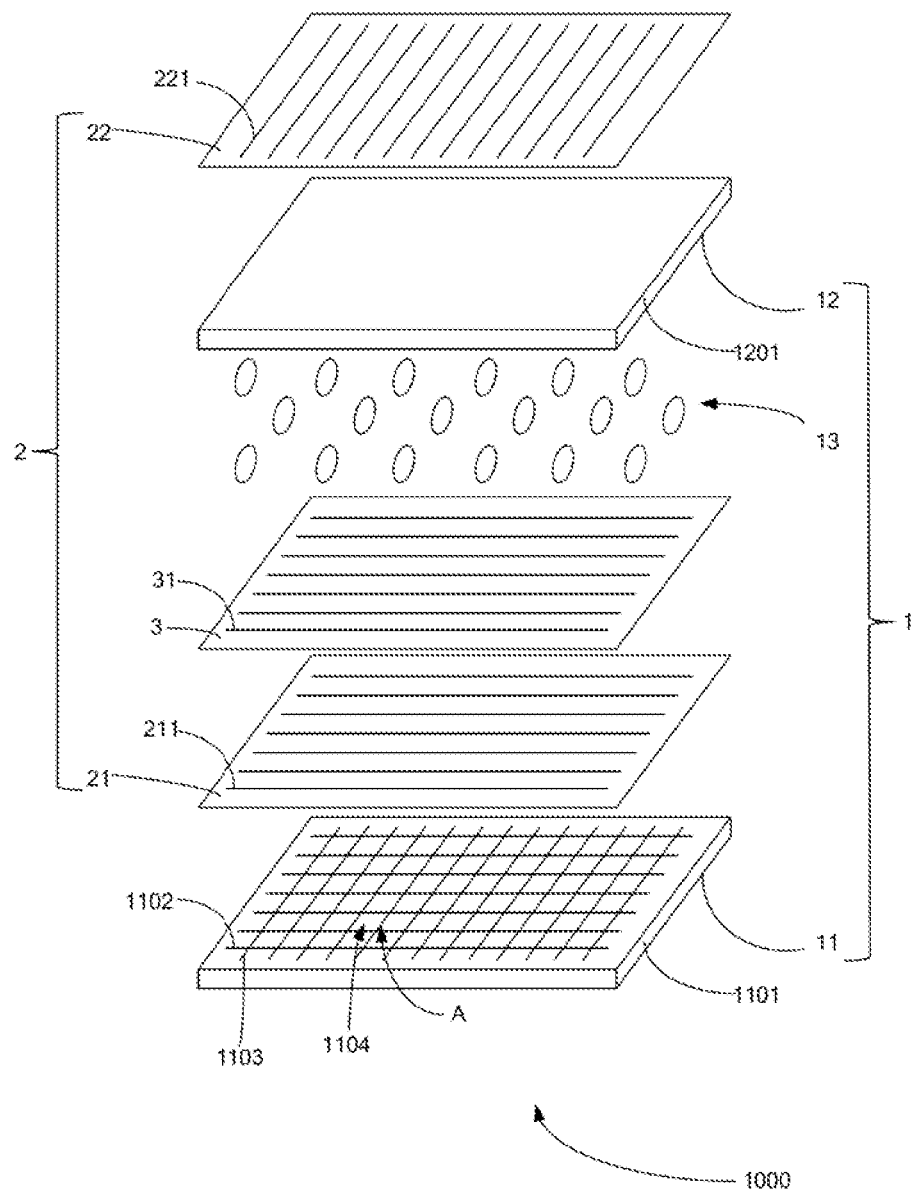
FIG. 1 is an exploded, isometric view of an embodiment of a touch device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Referring to FIG. 1, the touch device 1000 includes a display panel 1, a touch sensor assembly 2 and a resistance reduction layer 3. The display panel 1, such as a liquid crystal display panel, includes a first substrate 11, a second substrate 12 and a liquid crystal layer 13. The first substrate 11 is opposite to the second substrate 12. The liquid crystal layer 13 is positioned between the first substrate 11 and the second substrate 12. The first substrate 11 includes a first substratum 1101, a number of gate lines 1102, and a number of source lines 1103. The gate lines 1102 and the source lines 1103 are formed on the first substratum 1101, and regions corresponding to the gate lines 1102 and the source lines 1103 of the display panel 1 defines a light blocking area A. The display panel 1 further includes a number of pixel units 1104 outside of the light blocking area A. The second substrate 12 includes a second substratum 1201.

The touch sensor assembly 2 includes a first conducting layer 21 and a second conducting layer 22. The first conducting layer 21 is formed on the first substratum 1101 and is on one side of the gate lines 1102 and the source lines 1103 adjacent to the liquid crystal layer 13. The second conducting layer 22 is insulated to the first conducting layer 21. The second conducting layer 22 and the first conducting layer 21 cooperatively form a touch sensing structure. The first conducting layer 21 includes a number of touch sensors 211. The second conducting layer 22 includes a number of touch sensors 221. The resistance reduction layer 3 is formed on the first conducting layer 21 and is electrically connected to the first conducting layer 21. The resistance reduction layer 3 includes a number of resistance reduction units 31 coupled to the touch sensors 211. Each of the touch sensors is coupled to at least one resistance reduction unit 31. The resistance reduction units 31 correspond to the light blocking area A, thus the aperture ratio of the display panel 1 will not be reduced. In this embodiment, the resistance reduction units 31 correspond to the light block region A is defined by the gate lines 1102.

Figure 2:
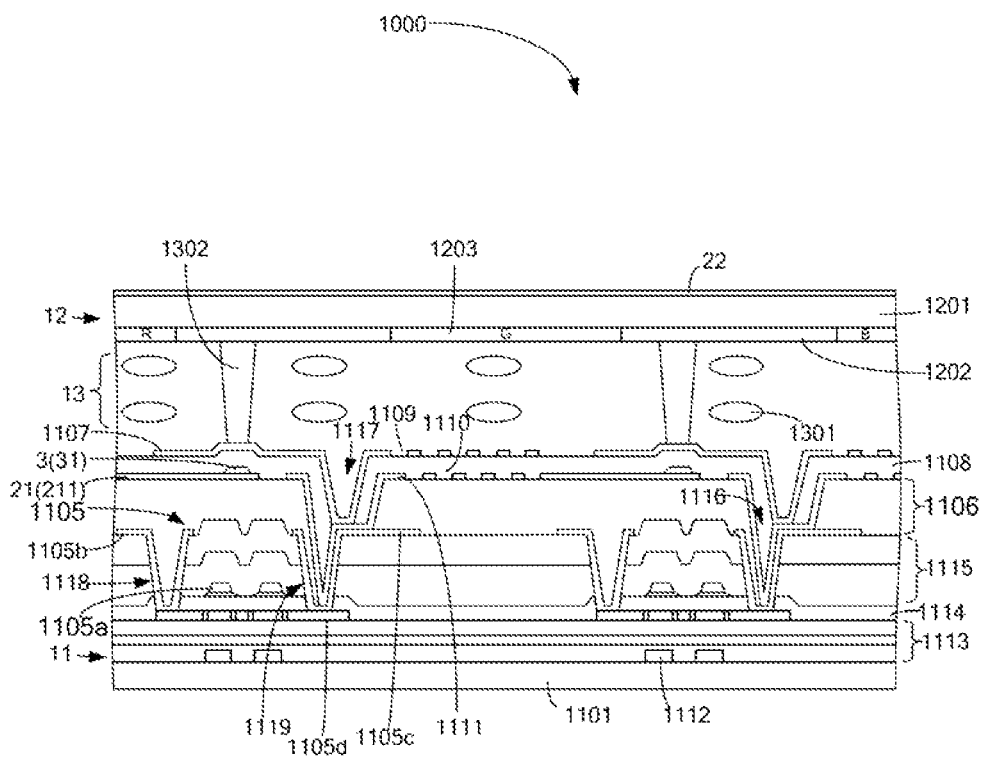
FIG. 2 is a cross-sectional view of the touch device of FIG. 1, the touch device includes a resistance reduction unit.

FIG. 2 illustrates a cross-sectional view of a part of the touch device 1000. The first substrate 11 further includes a number of thin film transistors 1105, a passivation layer 1106, and a number of pixel electrodes 1107. The thin film transistors 1105 which serve as switch elements to selectively allow data signals of the source lines to transmit to corresponding to pixel electrodes 1107 are formed on the substratum 1101. The passivation layer 1106 covers the thin film transistors 1105. The first conducting layer 21 is insulated to the thin film transistors 1105. The pixel electrodes 1107 are insulated to the first conducting layer 21.

In the embodiment, the second substrate 12 includes a number of black matrixes 1202, and a number of color filter units 1203. The black matrixes 1202 and the color filter units 1203 serve as a color filter of the display panel 1. The color filter units 1203 include, for example, red filter units R, green filter units G, and blue filter units B. The black matrixes 1202 and the color filter units 1203 are formed on the second substratum 1201 adjacent to the liquid crystal layer 13. The red filter units R, green filter units G and blue filter units B are disposed between two adjacent black matrixes 1202 respectively.

In this embodiment, the display panel 1 is an In-Plane Switching (IPS) liquid crystal display panel or a Fringing Field Switching (FFS) liquid crystal display panel. The first conducting layer 21 is also simultaneously serves as a common electrode of the display panel 1. The first conducting layer 21 cooperating with the pixel electrodes 1107 controls liquid crystal molecules 1301 of the liquid crystal layer 137.

The first conducting layer 21 is formed on the passivation layer 1106. The resistance reduction layer 3 is formed on the first conducting layer 21. Each of the touch sensors 211 of the first conducting layer 21 is coupled to at least one resistance reduction unit 31 of the resistance reduction layer 3. The display 1 further includes an insulation layer 1108. The insulation layer 1108 covers the first conducting layer 21 and the resistance reduction layer 3. The pixel electrode 1107 is formed on the insulation layer 1108. A first hole 1116 is defined in the passivation layer 1106. The first substrate 11 further includes a connecting layer 1111. The connecting layer 1111 is coupled to the thin film transistor 1105 via the first hole 1116. A second hole 1117 is defined in the insulation layer 1108. The pixel electrode 1107 is coupled to the thin film transistor 1105 via the second hole 1117 and the connecting layer 1111.

In the embodiment, the first conducting layer 21 and the pixel electrode 1107 can be for example made of Indium Tin Oxide (ITO). The resistance reduction layer 3 and the connecting layer 1111 can be for example made of metal. An equivalent resistance formed by the resistance reduction layer 3 and the first conducting layer 21 is less than an intrinsic resistance of the first conducting layer 21. Thus, the resistance reduction layer 3 reduces the resistance of the first conducting layer 21, and the response speed of the touch device 1000 is increased.

Figure 3:
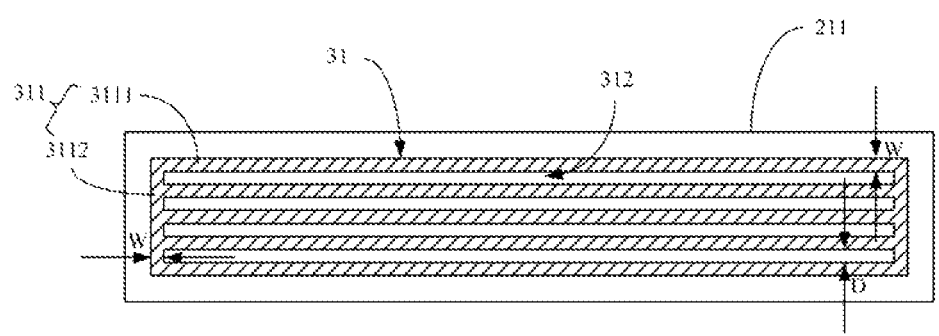
FIG. 3 is a top view of the resistance reduction unit of FIG. 2.

Referring also to FIG. 3, an exemplary resistance reduction unit 31 is shown. The resistance reduction unit 31 is formed on the touch sensor 211. The resistance reduction unit 31 includes a number of resistance reduction strips 311. In this embodiment, the resistance reduction strips 311 include at least two first strips 3111 and two second strips 3112. The first strips 3111 are parallel from each other. The two second strips 3112 are parallel from each other. The two ends of each first strip 3111 are respectively coupled to the second strips 3112. The first strips 3111 and the second strips 3112 are interleaved and gaps between the resistance reduction strips 311 define a number of open areas 312.

Figure 4:
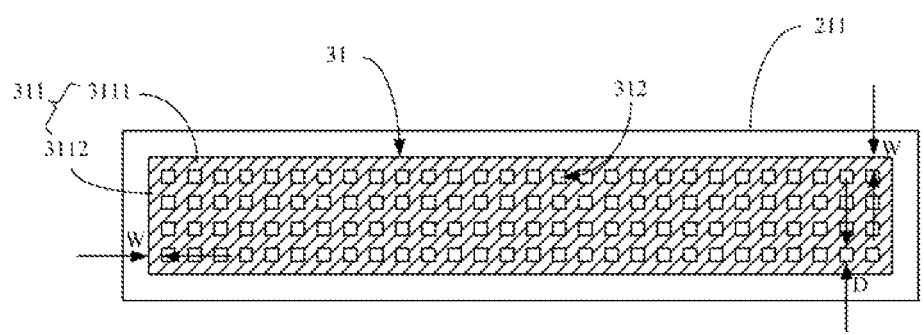
FIG. 4 is a top view of another embodiment of the resistance reduction unit of FIG. 2.

Referring to FIG. 4, another exemplary resistance reduction unit 31 is shown. In this embodiment, the resistance reduction strips 311 include at least two first strips 3111 and at least two second strips 3112. The at least two strips 3111 and at least two second strips 3112 form a mesh pattern. A width W of each of the first strips 3111 or the second strips 3112 is in a range of 10 μm to 30 μm. A distance D of two adjacent first strips 3111 or second strips 3112 is in a range of 100 μm to 300 μm.

Referring to FIG. 2, in this embodiment, the thin film transistor 1105 is a Low Temperature Poly-Silicon (LTPS) thin film transistor. The thin film transistor 1105 includes a gate electrode 1105a, a source electrode 1105b, a drain electrode 1105c, and a channel layer 1105d. The firs substrate 11 further includes a number of light shielding portions 1112, a first isolation group 1113, a gate insulation layer 1114, and a second isolation group 1115.

The light shielding portions 1112 are formed on the first substratum 1101. The first isolation group 1113 is formed on the first substratum 1101 and covers the light shielding portions 1112. The channel layer 1105d is formed on the first isolation group 1113. The gate insulation layer 1114 covers the channel layer 1105d. The gate electrode 1105a is formed on the gate insulation layer 1114. The second isolation group 1115 is formed on the gate electrode 1105a and the gate insulation layer 1114. A third hole 1118 and a fourth hole 1119 is defined on the second isolation group 1115 and the gate insulation layer 1114. The fourth hole 1119 is opposite to the second hole 1117. The source electrode 1105b and the drain electrode 1105c are formed on the second isolation group 1115. The source electrode 1105b is coupled to the channel layer 1105d via the third hole 1118. The drain electrode 1105c is coupled to the channel layer 1105d via the fourth hole 1119. The passivation layer 112 covers the second isolation group 1115, the source electrode 1105b, and the drain electrode 1105c.

The pixel electrode 1107 defines a number of first intervals 1109. The first conducting layer 21 defines a number of second intervals 1110. The first intervals 1109 and the second intervals 1110 are interlaced.

The resistance reduction layer 3 reduces the resistance of the first conducting layer 21, and the response speed of the touch device 1000 is increased.

Figure 5:
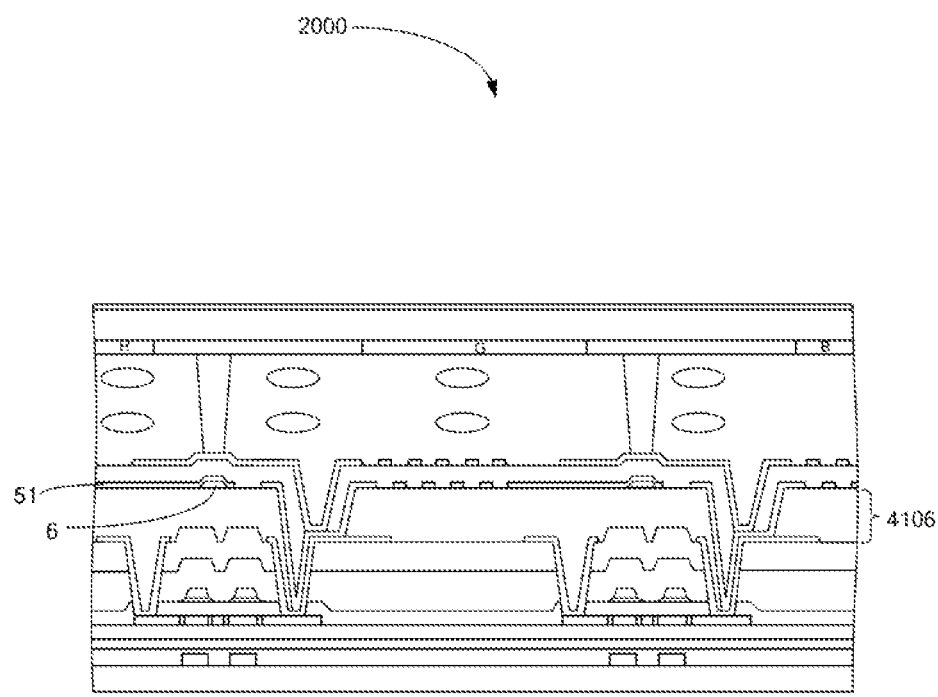
FIG. 5 is a cross-sectional view of a second embodiment of the touch device.

FIG. 5 illustrates a cross-sectional view of a second embodiment of the touch device 2000. Referring to FIG. 5, the touch device 2000 is substantially the same with the touch device 1000 of the first embodiment. But in the second embodiment, the resistance reduction layer 6 is formed on the passivation layer 4106 and is covered by the first conducting layer 51.

Figure 6:
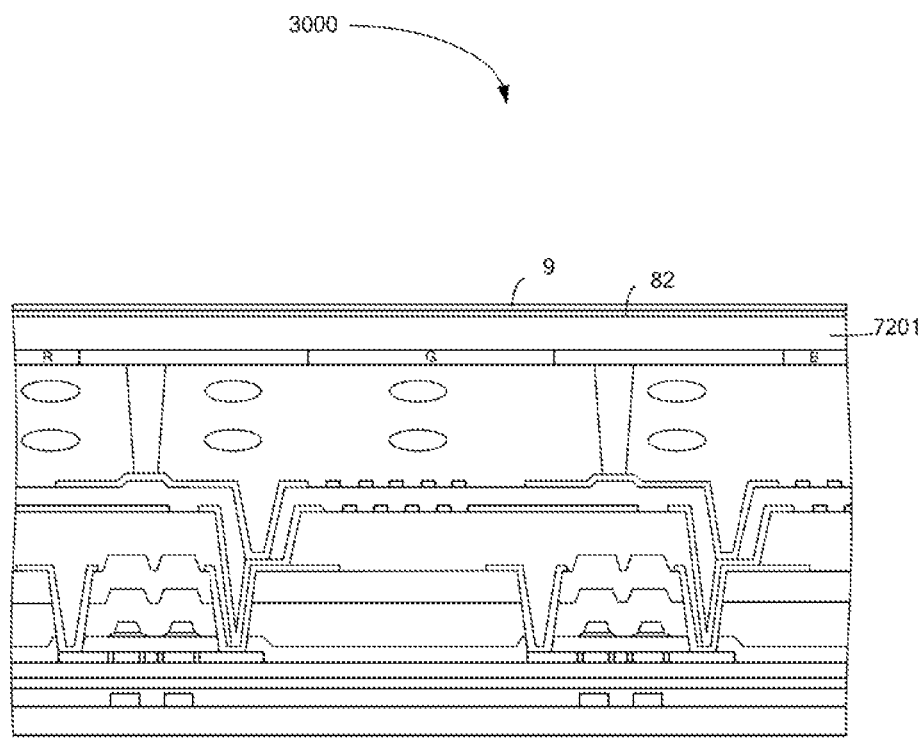
FIG. 6 is cross-sectional view of a third embodiment of the touch device.

FIG. 6 illustrates a cross-sectional view of a third embodiment of the touch device 3000. Referring to FIG. 6, the touch device 3000 is substantially the same with the touch device 1000 of the first embodiment. But in the third embodiment, the resistance reduction layer 9 is formed on second conducting layer 82. The resistance reduction layer 6 reduces the resistance of the second conducting layer 82, and the response speed of the touch device 3000 is increased.

The embodiments shown and described above are only examples. Many details are often found in the art such as the other features of a touch device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A touch device, comprising:
   a first conducting layer;
   a second conducting layer insulated from the first conducting layer, the first conducting layer and the second conducting layer cooperatively forming a touch sensing structure; and
   a resistance reduction layer electrically connected to the first conducting layer, an equivalent resistance formed by the resistance reduction layer and the first conducting layer is less than an intrinsic resistance of the first conducting layer.

2. The touch device of claim 1, wherein the first conducting layer comprises a number of touch sensors, the resistance reduction layer comprises a number of resistance reduction unit, and each of the touch sensors couples to at least one of the resistance reduction units.

3. The touch device of claim 2, wherein each of the resistance reduction units comprises a number of resistance reduction strips, and the resistance reduction strips are interleaving and gaps between the resistance reduction strips define a number of open areas.

4. The touch device of claim 3, wherein the resistance reduction strips comprises at least two first strips parallel to each other and two second strips parallel to each other.

5. The touch device of claim 4, wherein two ends of each first strip are respectively coupled to the two second strips.

6. The touch device of claim 5, wherein a width of each of the first strips or the second strips is in a range of 10 µm to 30 µm, a distance of two adjacent first strips or second strips is in a range of 100 µm to 300 µm.

7. The touch device of claim 4, wherein at least two first strips and at least two second strips form a mesh pattern.

8. The touch device of claim 7, wherein a width of each of the first strips or the second strips is in a range of 10 µm to 30 µm, a distance of two adjacent first strips or second strips is in a range of 100 µm to 300 µm.

9. The touch device of claim 1, wherein the resistance reduction layer is formed on the first conducting layer.

10. The touch device of claim 1, wherein the resistance reduction layer is made of metal, and the first conducting layer is made of Indium Tin Oxide.

11. The touch device of claim 1, wherein the touch device further comprises a display panel, the display panel comprises a first substratum, a number of gate lines, and a number of source lines, the gate lines and the source lines are formed on the first substratum, and regions corresponding to the gate lines and the source lines of the display panel defines a light blocking area.

12. The touch device of claim 11, wherein the display panel further comprises a number of pixel units outside of the light blocking area.

13. The touch device of claim 12, wherein the first conducting layer and the resistance reduction layer are formed on the first substratum.

14. The touch device of claim 13, wherein the display device further comprises a second substrate opposite to the first substrate and a liquid layer sandwiching between the first substrate and the second substrate, the first substrate further comprises a number of thin film transistors forming on the first substrate, a passivation layer covers the thin film transistors, a pixel electrode is insulating to the first conducting layer, and the thin film transistors are insulated to the first conducting layer.

15. The touch device of claim 14, wherein the first conducting layer is formed on the passivation and covers the resistance reduction layer.

16. The touch device of claim 15, wherein the second substrate comprises a second substratum, a number of black matrixes are formed on the second substratum, a number of color filter units are formed on the second substratum, and the second conducting layer is formed on the second substratum.

17. The touch device of claim 13, wherein the first conducting layer simultaneously serves as a common electrode of the display panel.

18. The touch device of claim 16, wherein the first substrate further comprises an insulation layer covering the first conducting layer and the resistance reduction layer, and the pixel electrode is formed on the insulation layer.

19. A touch device, comprising:
a first substrate comprising a plurality of thin film transistors and a first conducting layer;
a second substrate opposite to the first substrate, the second substrate comprising:
a color filter;
a second conducting layer insulated from the first conducting layer, the first conducting layer and the second conducting layer cooperatively forming a touch sensing structure; and
a resistance reduction layer electrically connected to the second conducting layer, an equivalent resistance formed by the resistance reduction layer and the second conducting layer is less than an intrinsic resistance of the second conducting layer; and
a liquid crystal layer positioned between the first substrate and the second substrate.

* * * * *